(12) United States Patent
Park et al.

(10) Patent No.: US 9,055,250 B2
(45) Date of Patent: *Jun. 9, 2015

(54) CORRELATED DOUBLE SAMPLING CIRCUIT, METHOD THEREOF AND DEVICES HAVING THE SAME

(71) Applicant: SAMSUNG ELECTRONICS CO., LTD., Suwon-si, Gyeonggi-do (KR)

(72) Inventors: Yu Jin Park, Seoul (KR); Jin Ho Seo, Seoul (KR); Seog Heon Ham, Suwon-si (KR); Kwang Hyun Lee, Seongnam-si (KR); Han Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,687

(22) Filed: May 13, 2014

(65) Prior Publication Data

US 2014/0333813 A1    Nov. 13, 2014

Related U.S. Application Data

(63) Continuation of application No. 13/239,035, filed on Sep. 21, 2011, now Pat. No. 8,743,258.

(30) Foreign Application Priority Data

Nov. 29, 2010  (KR) .................. 10-2010-0120067
Dec. 14, 2010  (KR) .................. 10-2010-0127385

(51) Int. Cl.
*H04N 5/335*    (2011.01)
*H04N 5/3745*   (2011.01)
*H04N 5/357*    (2011.01)
*G01J 1/46*     (2006.01)
*H04N 5/378*    (2011.01)

(52) U.S. Cl.
CPC .............. *H04N 5/3745* (2013.01); *H04N 5/335* (2013.01); *H04N 5/357* (2013.01); *G01J 1/46* (2013.01); *H04N 5/378* (2013.01)

(58) Field of Classification Search
CPC ....... H04N 5/378; H04N 5/374; H04N 5/357; H04N 5/335; H04N 5/3745
USPC ........................................................ 348/308
See application file for complete search history.

(56) References Cited

U.S. PATENT DOCUMENTS 6,727,486 B2 *  4/2004  Choi ..................... 250/208.1
7,345,613 B2 *  3/2008  Higuchi ................. 341/155
7,646,410 B2 *  1/2010  Lim ....................... 348/241

(Continued)

FOREIGN PATENT DOCUMENTS

JP          2007028192 A       2/2007

(Continued)

*Primary Examiner* — Ahmed A Berhan
(74) *Attorney, Agent, or Firm* — Sughrue Mion, PLLC

(57) ABSTRACT

A CDS circuit includes first capacitors; second capacitors; and a switch arrangement which, in response to a switch control signal, connects the first capacitors in series between a pixel signal output node and a ground to compress the pixel signal and connects the second capacitors in series between a ramp signal output node and the ground to compress the ramp signal, or connects the first capacitors in parallel between the pixel signal output node and a first input node of the comparator and connects the second capacitors in parallel between the ramp signal output node and a second input node of the comparator.

13 Claims, 18 Drawing Sheets

(56) References Cited

U.S. PATENT DOCUMENTS

2002/0118289 A1 8/2002 Choi
2009/0244335 A1 10/2009 Chou
2010/0039544 A1 2/2010 Tejada et al.

FOREIGN PATENT DOCUMENTS

| KR | 1020060077463 A | 7/2006 |
| KR | 100707075 B1 | 4/2007 |
| KR | 1020090010073 A | 1/2009 |

* cited by examiner

CORRELATED DOUBLE SAMPLING CIRCUIT, METHOD THEREOF AND DEVICES HAVING THE SAME

CROSS-REFERENCE TO RELATED APPLICATIONS

This application is a continuation application of U.S. patent application Ser. No. 13/239,035 filed Sep. 21, 2011, which claims priority from Korean Patent Application Nos. 10-2010-0120067 filed on Nov. 29, 2010, and 10-2010-0127385 filed on Dec. 14, 2010, the disclosures of which are herein incorporated by reference in their entireties.

BACKGROUND

Methods and apparatuses consistent with exemplary embodiments relate to an image sensor, and more particularly, to a correlated double sampling (CDS) circuit for getting over a limit of an input range, an operation method thereof and devices having the same.

An image sensor is a device for converting an optical image signal into an electrical image signal. The image sensor includes a correlated double sampling (CDS) circuit for reducing a fixed pattern noise (FPN) and a reset noise. The CDS circuit should have a wide input range to get a high quality image.

SUMMARY

According to one or more aspects of an exemplary embodiment, there is provided a correlated double sampling (CDS) circuit for getting over a limit of an input range, an operation method thereof and devices having the same.

An exemplary embodiment is directed to a correlated double sampling (CDS) circuit, including a signal compressor compressing each of a pixel signal and a ramp signal using capacity dividing and outputting a compressed pixel signal and a compressed ramp signal and a comparator comparing the compressed pixel signal with the compressed ramp signal and outputting a comparative signal corresponding to a comparison result.

According to an exemplary embodiment, the signal compressor includes a plurality of first capacitors, a plurality of second capacitors, and a switch arrangement connecting the plurality of first capacitors in series between a pixel signal output node and a ground to compress the pixel signal and connecting the plurality of second capacitors in series between a ramp signal output node and the ground to compress the ramp signal in response to a switch control signal.

The plurality of first capacitors includes a first capacitor, which is connected between the pixel signal output node and a first input node of the comparator, and a second capacitor having a terminal connected to the ground. The plurality of second capacitors includes a third capacitor, which is connected between the ramp signal output node and a second input node of the comparator, and a fourth capacitor a terminal of which is connected to the ground.

The switch arrangement includes a first switch, which is connected between the first input node and the other terminal of the second capacitor and switches in response to the switch control signal, and a second switch, which is connected between the second input node and the other terminal of the fourth capacitor and switches in response to the switch control signal.

According to another exemplary embodiment, the signal compressor includes a plurality of first capacitors, a plurality of second capacitors and a switch arrangement connecting the plurality of first capacitors in series between a pixel signal output node and a ground to compress the pixel signal and connecting the plurality of second capacitors in series between a ramp signal output node and the ground to compress the ramp signal in response to a switch control signal, or connecting the plurality of first capacitors in parallel between the pixel signal output node and a first input node of the comparator and connecting the plurality of second capacitors in parallel between the ramp signal output node and a second input node of the comparator in response to the switch control signal.

The plurality of first capacitors includes a first capacitor, which is connected between the pixel signal output node and the first input node, and a second capacitor whose one terminal is connected to the first input node. The plurality of second capacitors includes a third capacitor, which is connected between the ramp signal output node and the second input node, and a fourth capacitor whose terminal is connected to the second input node.

The switch arrangement includes a first switch and a second switch, which are connected in series between the pixel signal output node and the ground via the other terminal of the second capacitor, and a third switch and a fourth switch, which are connected in series between the ramp signal output node and the ground via the other terminal of the fourth capacitor.

An exemplary embodiment is directed to an image sensor, including a pixel outputting a pixel signal, a ramp signal generator generating a ramp signal, a signal compressor compressing each of the pixel signal and the ramp signal by using capacitive dividing and outputting a compressed pixel signal and a compressed ramp signal, and a comparator comparing the compressed pixel signal with the compressed ramp signal and outputting a comparative signal corresponding to a comparison result.

An exemplary embodiment is directed to an image sensing system, including the image sensor and a digital signal processor controlling the image sensor.

An exemplary embodiment is directed to an operation method of a CDS circuit, including compressing, by a signal compressor, each of a pixel signal and a ramp signal using capacitive dividing and outputting a compressed pixel signal and a compressed ramp signal, and comparing, by a comparator, the compressed pixel signal with the compressed ramp signal and outputting a comparative signal corresponding to a comparison result.

Another exemplary embodiment is directed to a correlated double sampling (CDS) circuit, including a boosting circuit, which generates a boosting voltage in response to a control signal to boost an initial direct current voltage of a pixel signal and an initial direct current voltage of a ramp signal, and a comparison circuit, which compares the pixel signal having an initial direct current voltage boosted by the boosting voltage with the ramp signal having an initial direct current voltage boosted by the boosting voltage and outputs a comparison signal corresponding to a comparison result.

The boosting circuit includes a first transistor connected between the comparator circuit and a ground and a second transistor connected between the comparator circuit and the ground. The first transistor is controlled by the control signal and the second transistor is a diode-connected transistor. According to an exemplary embodiment, the second transistor may be controlled by a voltage bias signal. Each of the first transistor and the second transistor is an NMOS transistor. According to an exemplary embodiment, the boosting circuit further includes a plurality of transistors connected to the other terminal of the second transistor in series.

According to an exemplary embodiment, one of the pluralities of transistors may be controlled by a voltage bias signal. Each of the plurality of transistors is an NMOS transistor.

According to an exemplary embodiment, the comparator circuit may include a current source whose terminal is connected to a voltage source, a first transistor and a second transistor each having a terminal connected to the other terminal of the current source, a third transistor and a fourth transistor each having a terminal connected to the other terminal of the first transistor, a fifth transistor and a sixth transistor each having a terminal connected to the other terminal of the second transistor, and a current mirror circuit connected to the other terminal of the third transistor, the other terminal of the fourth transistor, the other terminal of the fifth transistor and the other terminal of the sixth transistor.

Each of the fourth transistor and the fifth transistor is controlled by the control signal SWB, and each of the third transistor and the sixth transistor is a diode-connected transistor.

According to an exemplary embodiment, the comparator circuit may include a current source having a terminal connected to a voltage source, a first transistor and a second transistor each having a terminal connected to the other terminal of the current source, a current mirror circuit, a plurality of first transistors and a plurality of second transistors each connected in series between the other terminal of the first transistor and the current mirror circuit, and a plurality of third transistors and a plurality of fourth transistors each connected in series between the other terminal of the second transistor and the current mirror circuit. Each of the plurality of second transistors and each of the plurality of third transistors may be controlled by the control signal.

Another exemplary embodiment is directed to an image sensor, including a pixel outputting a pixel signal, a ramp generator generating a ramp signal and the correlated double sampling (CDS) circuit.

Another exemplary embodiment is directed to an operation method of a correlated double sampling (CDS) circuit, including boosting an initial direct current voltage of a pixel signal and an initial direct current voltage of a ramp signal in response to a control signal, and comparing the pixel signal having a boosted initial direct current voltage with the ramp signal having a boosted initial direct current voltage and outputting a comparative signal corresponding to a comparison result.

BRIEF DESCRIPTION OF THE DRAWINGS

These and/or other aspects and advantages will become apparent and more readily appreciated from the following description of exemplary embodiments, taken in conjunction with the accompanying drawings in which.

DETAILED DESCRIPTION OF EXEMPLARY EMBODIMENTS

Figure 1:
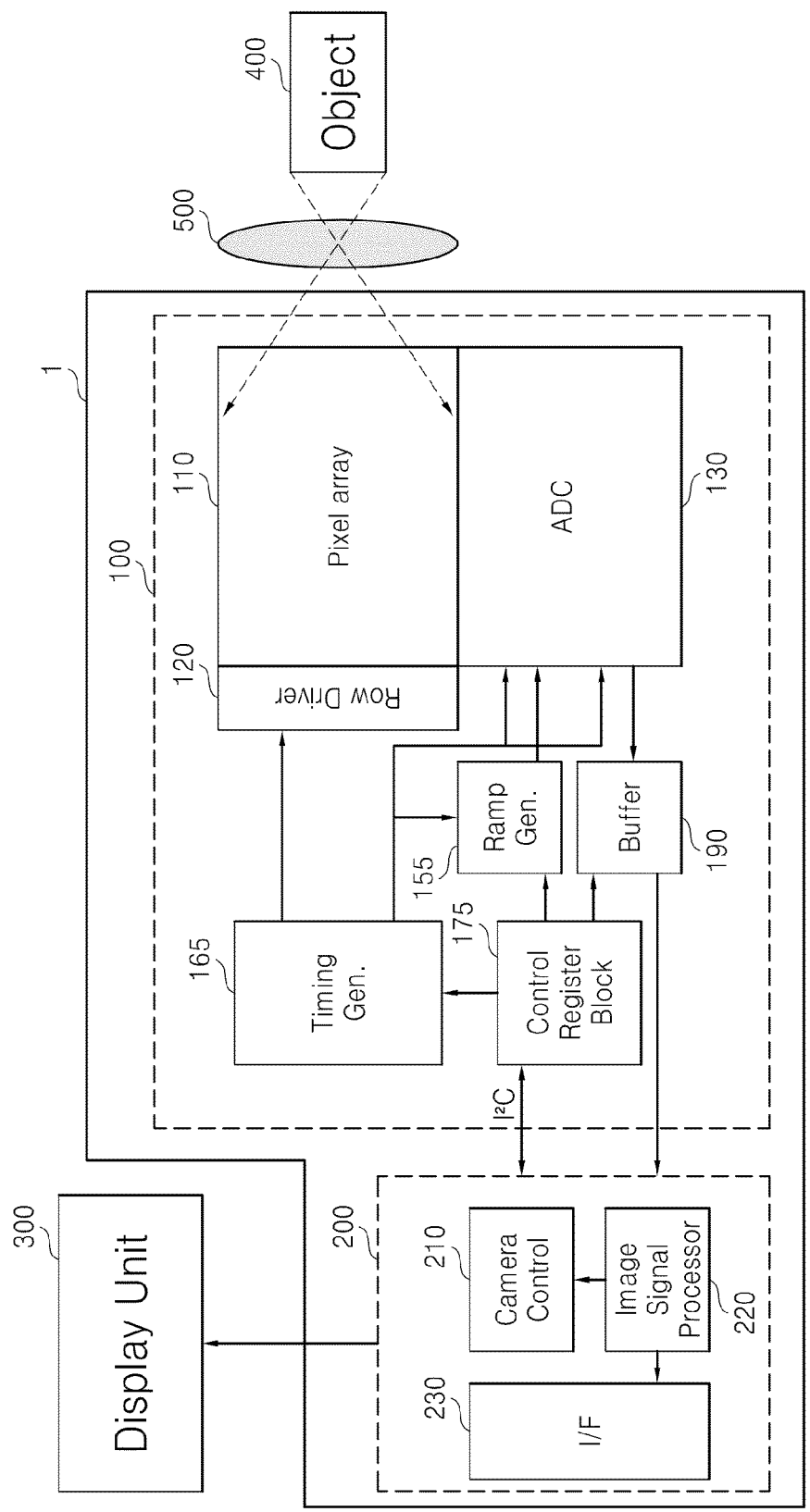
FIG. 1 is a schematic block diagram of an image sensing system including an image sensor according to an exemplary embodiment.

Exemplary embodiments now will be described more fully hereinafter with reference to the accompanying drawings. Exemplary embodiments may, however, be embodied in many different forms and should not be construed as limited to the exemplary embodiments set forth herein. Rather, these exemplary embodiments are provided so that this disclosure will be thorough and complete. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
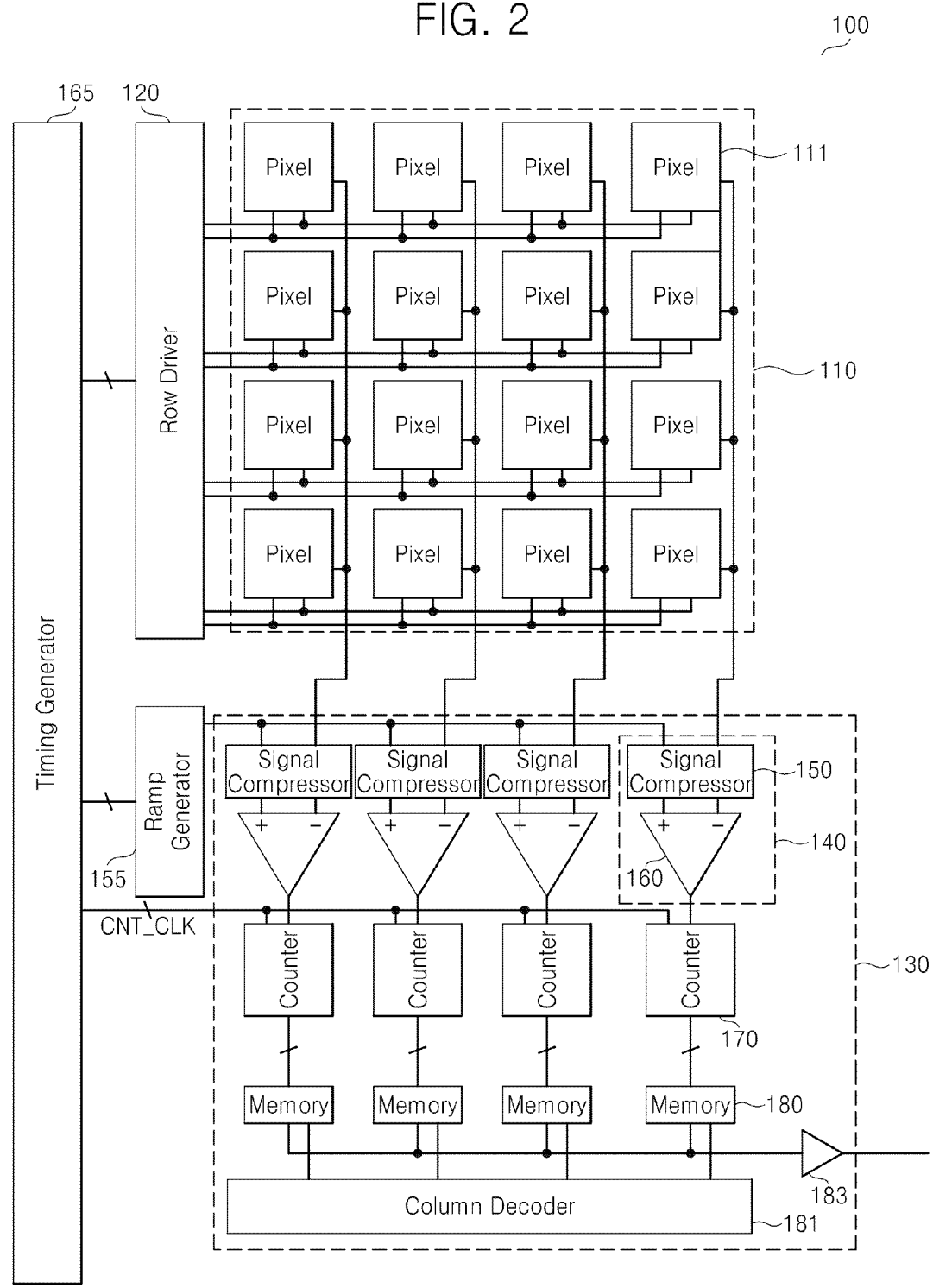
FIG. 2 is a block diagram depicting the image sensor illustrated in FIG. 1 in more detail.

FIG. 1 is a schematic block diagram of an image sensing system including an image sensor according to an exemplary embodiment, and FIG. 2 is a block diagram depicting more specifically the image sensor illustrated in FIG. 1. Referring to FIGS. 1 and 2, an image sensing system 1 includes an image sensor 100 and a digital signal processor 200.

The image sensing system 1 may sense an object 400 captured through a lens 500 by a control of the digital signal processor 200, and the digital signal processor 200 may output an image, which is sensed by the image sensor 100 and output to a display unit 300. The display unit 300 includes all kinds of devices outputting an image. For example, the display unit 300 may include a computer, a cellular phone and other image output terminals.

The digital signal processor 200 includes a camera control 210, an image signal processor 220 and a PC interface (I/F) 230. The camera control 210 controls a control register block 175. The camera control 210 may control the image sensor 100, i.e., the control register block 175, by using an inter-integrated circuit I²C, however, it is not restricted thereto.

The image signal processor 220 receives image data, which is an output signal of a buffer 190, processes an image to be seen and outputs a processed image to the display unit 300 through the PC I/F 230.

The image signal processor is illustrated to be inside the digital signal processor 200 in FIG. 1, however, its design may be changed by those skilled in the art. For example, the image signal processor 220 may be located inside the image sensor 100.

The image sensor 100 includes a pixel array 110, a row driver 120, an analog to digital converter ADC 130, a ramp generator 155 and a timing generator 165, a control register block 175 and the buffer 190.

The pixel array 110 may include a plurality of pixels in a form of matrix, e.g., 111, each connected to a plurality of row lines and a plurality of column lines.

The pixel 111 may include a red filter allowing light of a red wavelength region to pass through it, a green filter allowing light of a green wavelength region to pass through it and a blue filter allowing light of a blue wavelength region to pass through it. According to an exemplary embodiment, the pixel 111 may include a cyan filter, a magenta filter and a yellow filter.

The pixel 111 includes a plurality of transistors and an optical sensing element, e.g., a photo diode or pinned photo diode. Each of the plurality of pixels 111 senses light by using the optical sensing element and generates an image signal by converting sensed light into an electric signal.

The timing generator 165 may control an operation of the row driver 120, the ADC 130 and the ramp signal generator 155 by outputting a control signal to each of the row driver 120, the ADC 130 and the ramp signal generator 155. The control register block 175 may control an operation of the ramp signal generator 155, the timing generator 165 and the buffer 190 by outputting a control signal to each of the ramp signal generator 155, the timing generator 165 and the buffer 190. The control register block 175 operates under a control of the camera control 210.

The row driver 120 drives a pixel array by row. For example, the row driver 120 may generate a row selection signal. That is, the row driver 120 may decode a row control signal, e.g., an address signal, generated by the timing generator 165 and select at least one of row lines composing the pixel array 110 in response to a decoded row control signal. The pixel array 110 outputs a reset signal and an image signal from a row, which is selected by a row selection signal supplied from the row driver 120, to the ADC 130.

The ADC 130 includes a plurality of correlated double sampling circuits (hereinafter: "CDS circuits", e.g., 140), a plurality of counters (e.g., 170), a plurality of memories (e.g., 180), a column decoder 181 and a sense amplifier 183.

Figure 3:
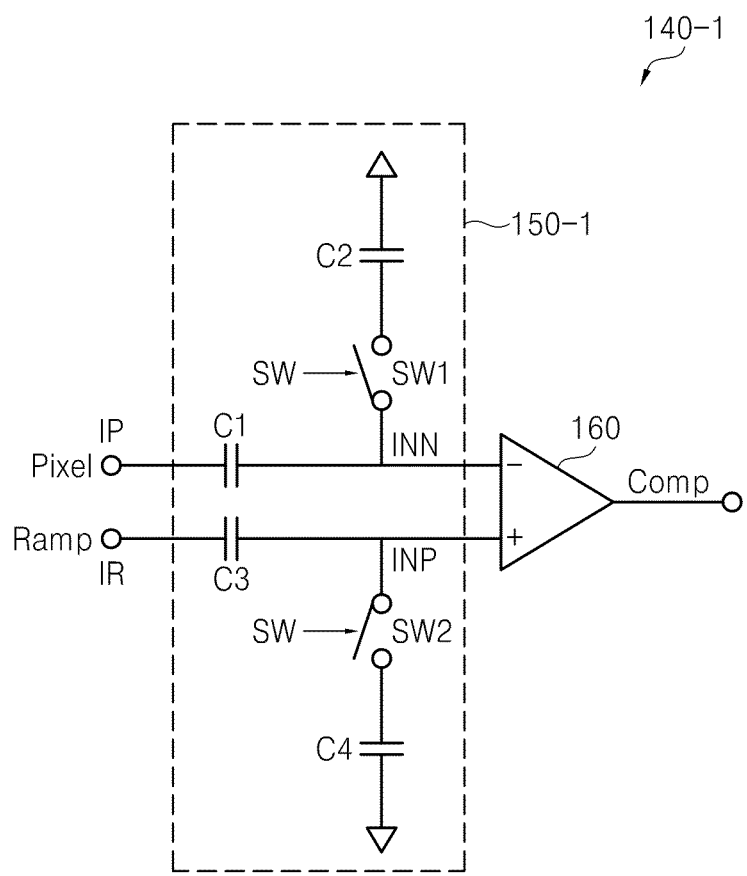
FIG. 3 depicts an exemplary embodiment of a correlated double sampling (CDS) circuit illustrated in FIG. 2.
Figure 4:
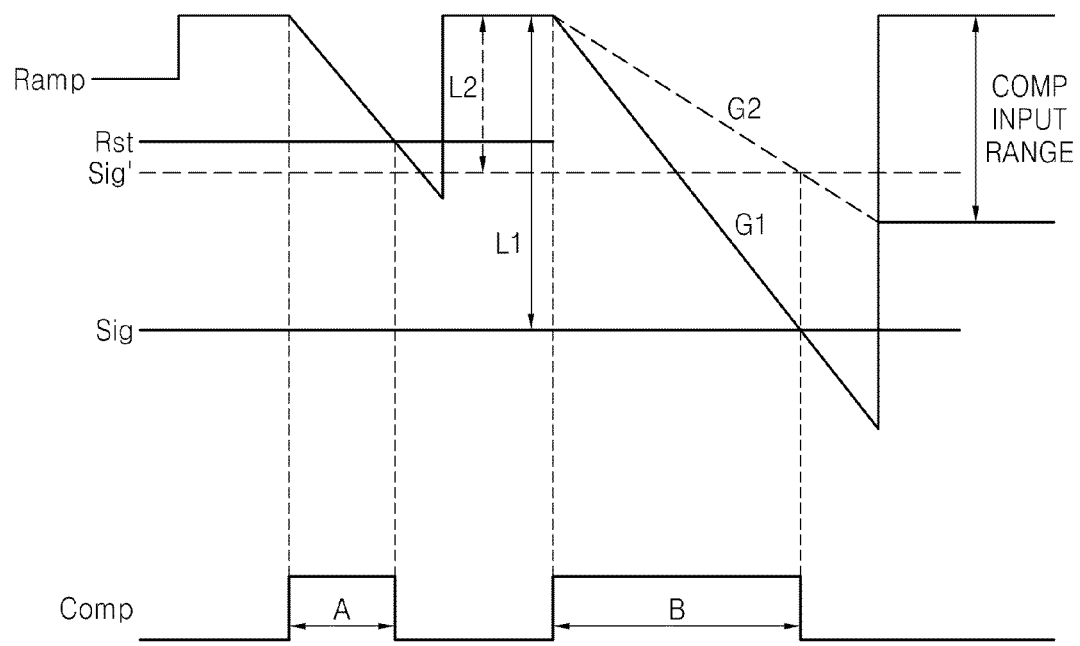
FIG. 4 is a graph for explaining an operation of the CDS circuit of FIG. 3.

FIG. 3 depicts an exemplary embodiment of the CDS circuit illustrated in FIG. 2, and FIG. 4 is a graph for explaining an operation of the CDS circuit of FIG. 3. Referring to FIGS. 1 to 4, the CDS circuit 140 compresses a pixel signal output from the pixel 111, e.g., a rest signal Rst or an image signal Sig, and a ramp signal Ramp, compares a compressed pixel signal, e.g., a compressed image signal Sig' or a compressed reset signal (not shown), with a compressed ramp signal and outputs a comparative signal Comp corresponding to a comparison result.

Referring to FIG. 3, a CDS circuit 140-1 according to an exemplary embodiment includes a signal compressor 150-1 and a comparator 160. Each of the CDS circuit 140-1 and the signal compressor 150-1 illustrated in FIG. 3 depicts an exemplary embodiment of the CDS circuit 140 and the signal compressor 150 illustrated in FIG. 2, respectively.

The signal compressor 150-1 compresses each of a pixel signal (e.g., an image signal Sig or a reset signal Rst) and a ramp signal Ramp by using capacitive dividing and outputs a compressed pixel signal and a compressed ramp signal. The signal compressor 150-1 includes a plurality of first capacitors C1 and C2, a plurality of second capacitors C3 and C4, and a switch arrangement SW1 and SW2.

The plurality of first capacitors C1 and C2 includes a first capacitor C1 connected between a pixel signal output node IP and a first input node INN to correct an offset of the comparator 160 and a pixel reset level and a second capacitor C2 whose terminal is connected to the ground for capacitive dividing. A pixel signal Pixel is a reset signal Rst or an image signal Sig.

The plurality of second capacitors C3 and C4 includes a third capacitor C3 connected between a ramp signal output node IR and a second input node INP to correct an offset of the comparator 160 and a ramp level and a fourth capacitor C4 whose terminal is connected to a ground for capacitive dividing.

In response to a switch control signal SW, the switch arrangement SW1 and SW2 connects the plurality of first capacitors C1 and C2 in series between a pixel signal output node IP and the ground to compress a pixel signal and connects the plurality of second capacitors C3 and C4 in series between a ramp signal output node IR and the ground to compress a ramp signal, or separates the plurality of first capacitors C1 and C2 from the pixel signal output node IP and the ground and separates the plurality of second capacitors C3 and C4 from the ramp signal output node IR and the ground.

The switch arrangement SW1 and SW2 includes a first switch SW1, which is connected between a first input node INN of the comparator 160 and the other terminal of the second capacitor C2 and becomes ON/OFF in response to a switch control signal SW, and a second switch SW2 which is connected between a second input node INP of the comparator 160 and the other terminal of the fourth capacitor C4 and becomes ON/OFF in response to the switch control signal SW.

The switch control signal SW may be generated by the timing generator 165.

When a level L1 of a pixel signal, e.g., an image signal Sig, and a gradient G1 of a ramp signal Ramp are out of an input range of the comparator 160 COMP INPUT RANGE, the comparator 160 may not operate. Accordingly, a pixel signal (e.g., an image signal Sig or a ramp signal Ramp) is compressed to operate within the input range.

When the first switch SW1 becomes turned on, a level L1 of a pixel signal, e.g., an image signal Sig, decreases by C1/(C1+C2) according to capacitive dividing. Accordingly, a level L2 of a compressed pixel signal, e.g., a compressed image signal Sig', is C1*L1/(C1+C2).

Similarly, when the second switch SW2 becomes turned on, a gradient G1 of a ramp signal decreases by C3/(C3+C4) according to capacitive dividing. Accordingly, a gradient G2 of a compressed ramp signal, e.g., the compressed ramp signal Rst' is C3*G1/(C3+C4). Since the level L2 of the compressed pixel signal, e.g., the compressed image signal Sig', and the gradient G2 of the compressed ramp signal Rst' belong to an input range of the comparator 160, the comparator 160 may compare the compressed pixel signal with the compressed ramp signal and output a comparison signal Comp corresponding to a comparison result.

Referring to FIG. 4, a comparison signal Comp before compression and a comparison signal Comp after compression are the same. A pixel signal, e.g., an image signal Sig or a reset signal Rst, output from the pixel 111 may be amplified by analog gain. The analog gain is controlled by a digital signal processor 200. Generally, when surroundings are dark, high analog gain is required. Here, a range of a pixel signal (e.g., an image signal Sig or a reset signal Rst) and a range of a ramp signal Ramp are within an input range of the comparator 160 (COMP INPUT RANGE).

When the analog gain is set high, e.g., ×16, a first switch SW1 and a second switch SW2 become turned off to prevent decrease of a signal to noise ratio SNR. Accordingly, when the analog gain is set high, a pixel signal (e.g., an image signal Sig or a reset signal Rst) and a ramp signal Ramp are not compressed, so that the SNR is not decreased.

Figure 5:
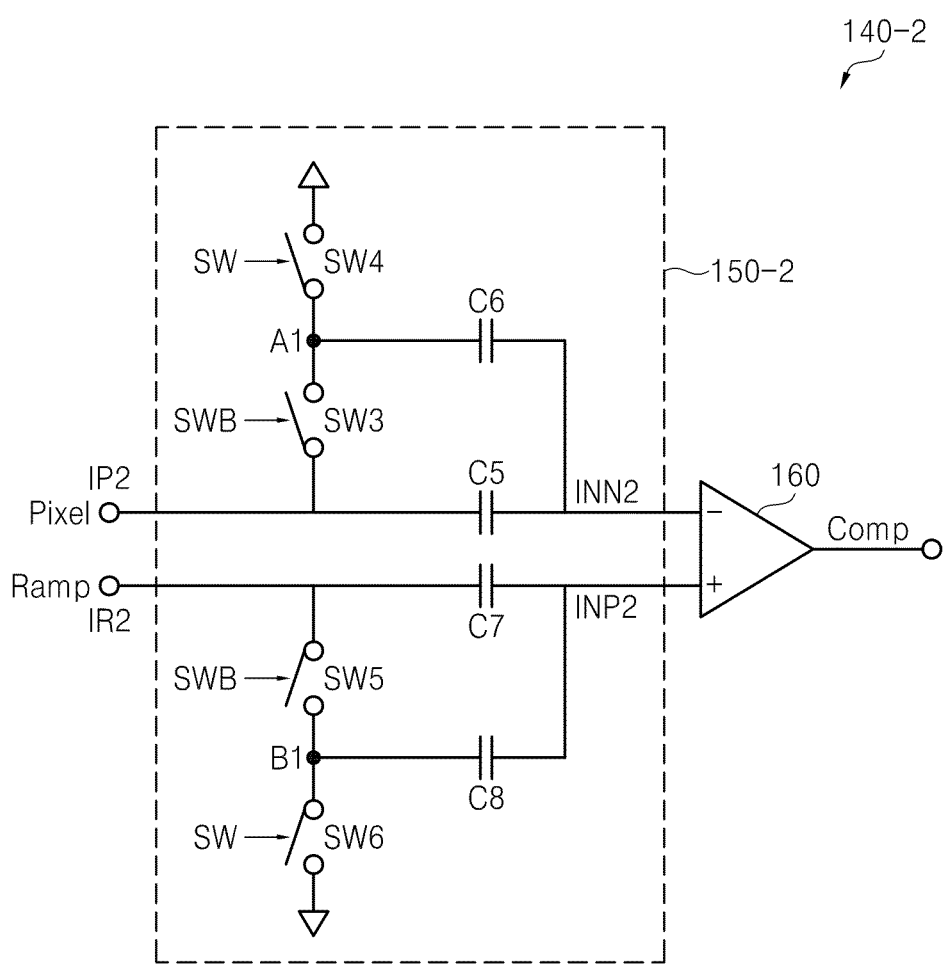
FIG. 5 depicts another exemplary embodiment of the CDS circuit illustrated in FIG. 2.

FIG. 5 depicts another exemplary embodiment of the CDS circuit illustrated in FIG. 2. Referring to FIGS. 1, 2, 4 and 5, a CDS circuit 140-2 according to an exemplary embodiment includes a signal compressor 150-2 and the comparator 160. Each of the CDS circuit 140-2 and the signal compressor 150-2 of FIG. 5 depicts another exemplary embodiment of each of the CDS circuit 140 and the signal compressor 150 of FIG. 2, respectively. FIG. 4 is a graph for explaining an operation of the CDS circuit of FIG. 3, however, it may also be understood as a graph for explaining an operation of the CDS circuit of FIG. 5.

The signal compressor 150-2 includes a plurality of first capacitors C5 and C6, a plurality of second capacitors C7 and C8, and a switch arrangement SW3, SW4, SW5 and SW6.

The plurality of first capacitors C5 and C6 includes a fifth capacitor C5 and a sixth capacitor C6. The fifth capacitor C5 is connected between a pixel signal output node IP2 and a first input node INN2 of the comparator 160 to correct an offset of the comparator 160 and a pixel reset level. A terminal of the sixth capacitor C6 is connected to the first input node INN2 of the comparator 160 for capacitive dividing of a pixel signal.

The plurality of second capacitors C7 and C8 includes a seventh capacitor C7 and a eighth capacitor C8. The seventh capacitor C7 is connected between a ramp signal output node IR2 and a second input node INP2 to correct an offset of the comparator 160 and a ramp level. The eighth capacitor C8 includes an eighth capacitor C8 having a terminal connected to the second input node INP of the comparator 160 for capacitive dividing.

In response to a switch control signal SW and a complementary switch control signal SWB, when a switch control signal SW is in high, for example, a switch arrangement SW3, SW4, SW5 and SW6 connects the plurality of first capacitors C5 and C6 in series between a pixel signal output node IP2 and a ground to compress a pixel signal Pixel and connects the plurality of second capacitors C7 and C8 in series between a ramp signal output node IR2 and the ground to compress a ramp signal Ramp In response to a switch control signal SW and a complementary switch control signal SWB, when a switch control signal SW is low, for example, a switch arrangement SW3, SW4, SW5 and SW6 connects the plurality of first capacitors C5 and C6 in parallel between a pixel signal output node IP2 and a first input node INN2 of the comparator 160 and connects the plurality of second capacitors C7 and C8 in parallel between a ramp signal output node IR2 and a second input node INP2 of the comparator 160.

Each of the plurality of switches SW3, SW4, SW5 and SW6 may be embodied in an NMOS transistor. A third switch SW3 is connected between the pixel signal output node IP2 and the other terminal of the sixth capacitor C6, and becomes ON/OFF by the switch control signal SW. A fourth switch SW4 is connected between the ground and the other terminal of the sixth capacitor C6, and becomes ON/OFF by the complementary switch control signal SWB. A fifth switch SW5 is connected between the ramp signal output node IR2 and the other terminal of the eighth capacitor C8, and becomes ON/OFF by the switch control signal SWB. A sixth switch SW6 is connected between the ground and the other terminal of the eighth capacitor C8, and becomes ON/OFF by the complementary switch control signal SWB. A pixel signal Pixel is an image signal Sig or a reset signal Rst.

When the third switch SW3 is turned off and the fourth switch SW4 is turned on, a level L1 of a pixel signal, e.g., an image signal Sig, decreases by C5/(C5+C6) according to capacitive dividing. Accordingly, a level L2 of a compressed pixel signal, e.g., a compressed image signal Sig', is C5*L1/(C5+C6). Similarly, when the fifth switch SW5 is turned off and the sixth switch SW6 is turned on, a gradient G1 of a ramp signal decreases by C7/(C7+C8) according to capacitive dividing. Accordingly, a gradient G2 of a compressed ramp signal, e.g., a compressed ramp signal Rst', is C7*G1/(C7+C8).

A level L2 of a compressed pixel signal, e.g., a compressed image signal Sig', and a gradient G2 of a compressed ramp signal belong in an input range of the comparator 160, so that the comparator 160 may compare the compressed pixel signal with the compressed ramp signal and output a comparative signal Comp corresponding to a comparison result.

When an analog gain is set high, e.g., ×16, the fourth switch SW4 and the sixth switch SW6 become turned off to prevent decrease of signal to noise ratio SNR. At the same time, the third switch SW3 and the fifth switch SW5 become turned on.

Accordingly, when the analog gain is set high, a fifth capacitor C5 and a sixth capacitor C6 are connected in parallel, so that a capacitor value for correcting an offset of the comparator 160 and a pixel reset level is (C5+C6). Likewise, a seventh capacitor C7 and an eighth capacitor C8 are connected in parallel, so that a capacitor value for correcting the offset of the comparator 160 and a ramp level is (C7+C8). It makes a value of parasitic capacitance relatively small. In addition, a pixel signal (e.g., an image signal Sig or a reset signal Rst) and a ramp signal Ramp are not compressed, so that the SNR is not decreased.

A comparative signal Comp may correspond to a difference value between an image signal Sig and a reset signal Rst which vary according to intensity of illumination of external light. The comparator 160 may pick up a difference between the image signal Sig and the reset signal Rst by using a ramp signal and output a comparative signal Comp according to a gradient of a ramp signal Ramp to output a difference between the image signal Sig and the reset signal Rst. A ramp generator 155 may operate based on a control signal generated by a timing generator 165.

A counter 170 is connected to an output terminal of the comparator 160, counts a comparative signal Comp according to a clock CNT_CLK input from the timing generator 165 and outputs a counting value by a digital signal.

Here, the clock CNT_CLK may be generated by a counter controller (not shown) located inside the counter 170 or inside the timing generator 165 based on a counter control signal generated by the timing generator 165. Here, the counter 170 may be embodied in an up/down counter or a bit-wise inversion counter. According to an exemplary embodiment, the counter 170 may output a counting value, which is calculated by subtracting a value counting a comparative signal A of difference between a reset signal Rst and a ramp signal Ramp from a value counting a comparative signal B of difference between an image signal Sig and a ramp signal Ramp, by a digital signal.

Based on a control signal generated by the timing generator 165, a memory 180 may operate according to a memory control signal generated by a memory controller (not shown) located inside the memory 180 or inside the timing generator 165 and may be embodied in a SRAM.

The memory 180 stores a digital signal output from the counter 170. One of digital signals stored in the plurality of memories is amplified by a sense amp 183 and output by image data under a control of a column decoder 181. A buffer 190 stores image data output from an ADC 130 tentatively and transmits the image data to a digital signal processor 200.

Figure 6:
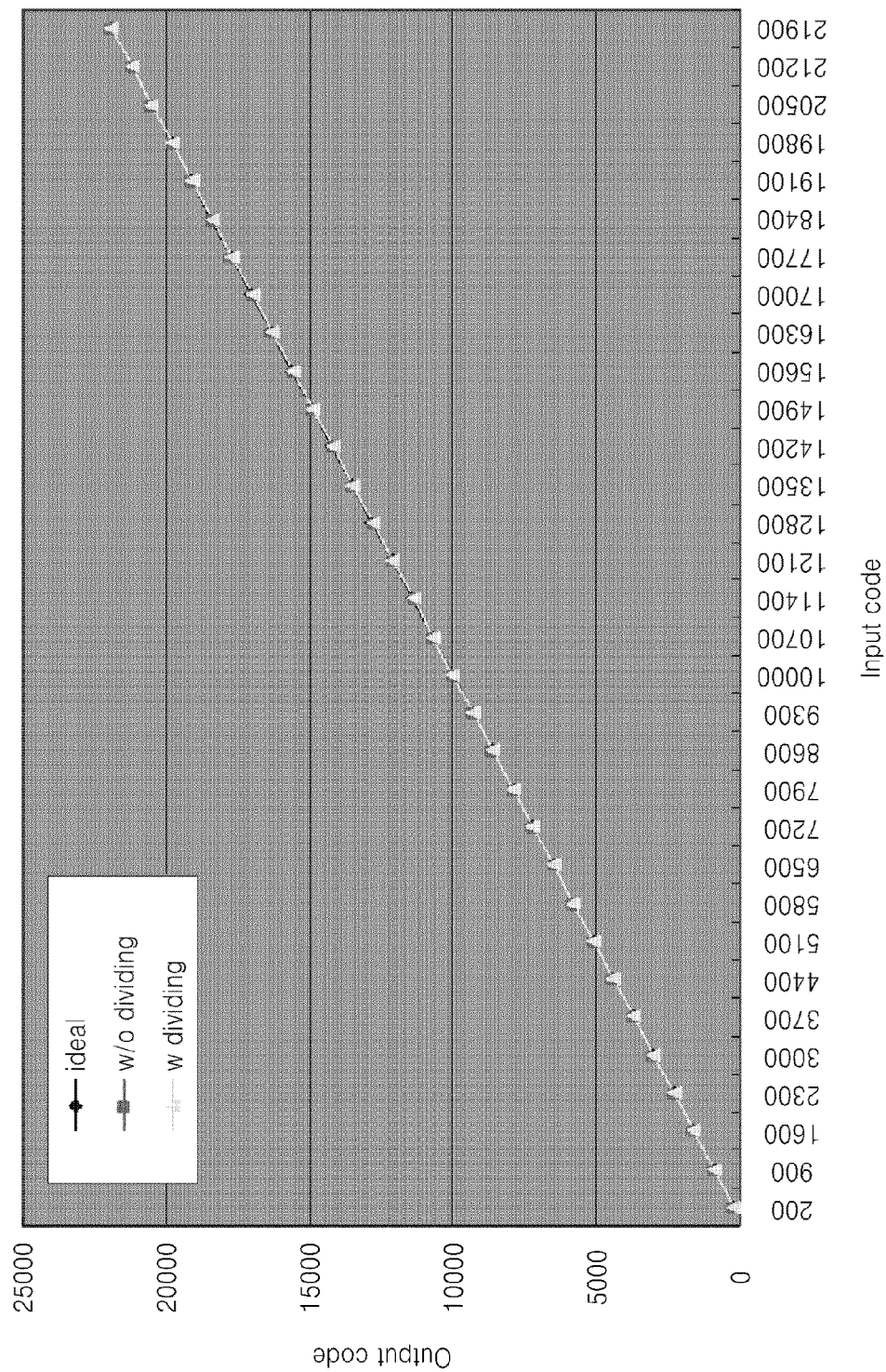
FIG. 6 is a graph depicting a simulation result of the image sensor according to an exemplary embodiment.

FIG. 6 is a graph displaying a simulation result of an image sensor according to an exemplary embodiment. Referring to FIGS. 1 to 6, an output value of an ideal counter 170, an output value of a counter 170 not using capacitive dividing and an output value of a counter 170 according to capacitive dividing are the same. That is, it means that although a pixel signal (e.g., an image signal Sig or a reset signal Rst) and a ramp signal Ramp are compressed, an output value of the counter 170 using a compressed pixel signal Sig' and a compressed ramp signal and an output value of the counter 170 using a pixel signal Sig and a ramp signal which are not compressed are the same.

Figure 7:
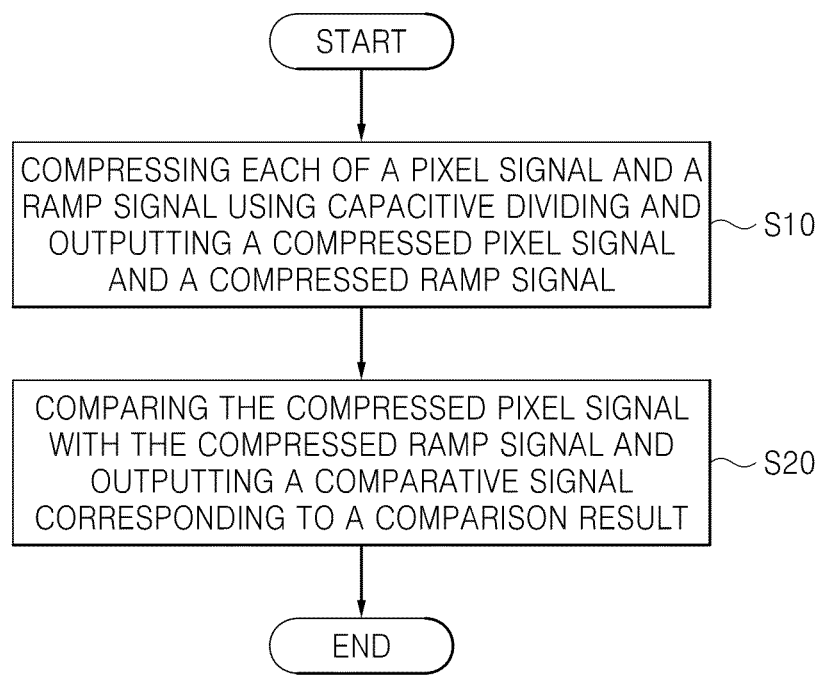
FIG. 7 is a flowchart for explaining an operation method of the CDS circuit according to an exemplary embodiment.

FIG. 7 is a flowchart for explaining an operation method of the CDS circuit according to an exemplary embodiment. Referring to FIGS. 1 to 7, a signal compressor 150 compresses each of a pixel signal Pixel and a ramp signal Ramp by using capacitive dividing and outputs a compressed pixel signal and a compressed ramp signal (S10). The pixel signal Pixel is an image signal Sig or a reset signal Rst.

According to an exemplary embodiment, when an analog gain is set high, e.g., ×16, a pixel signal Pixel and a ramp signal Ramp may not be compressed to prevent decrease of the SNR. The comparator 160 compares the compressed pixel signal with the compressed ramp signal and outputs a comparative signal corresponding to a comparison result (S20).

Figure 8:
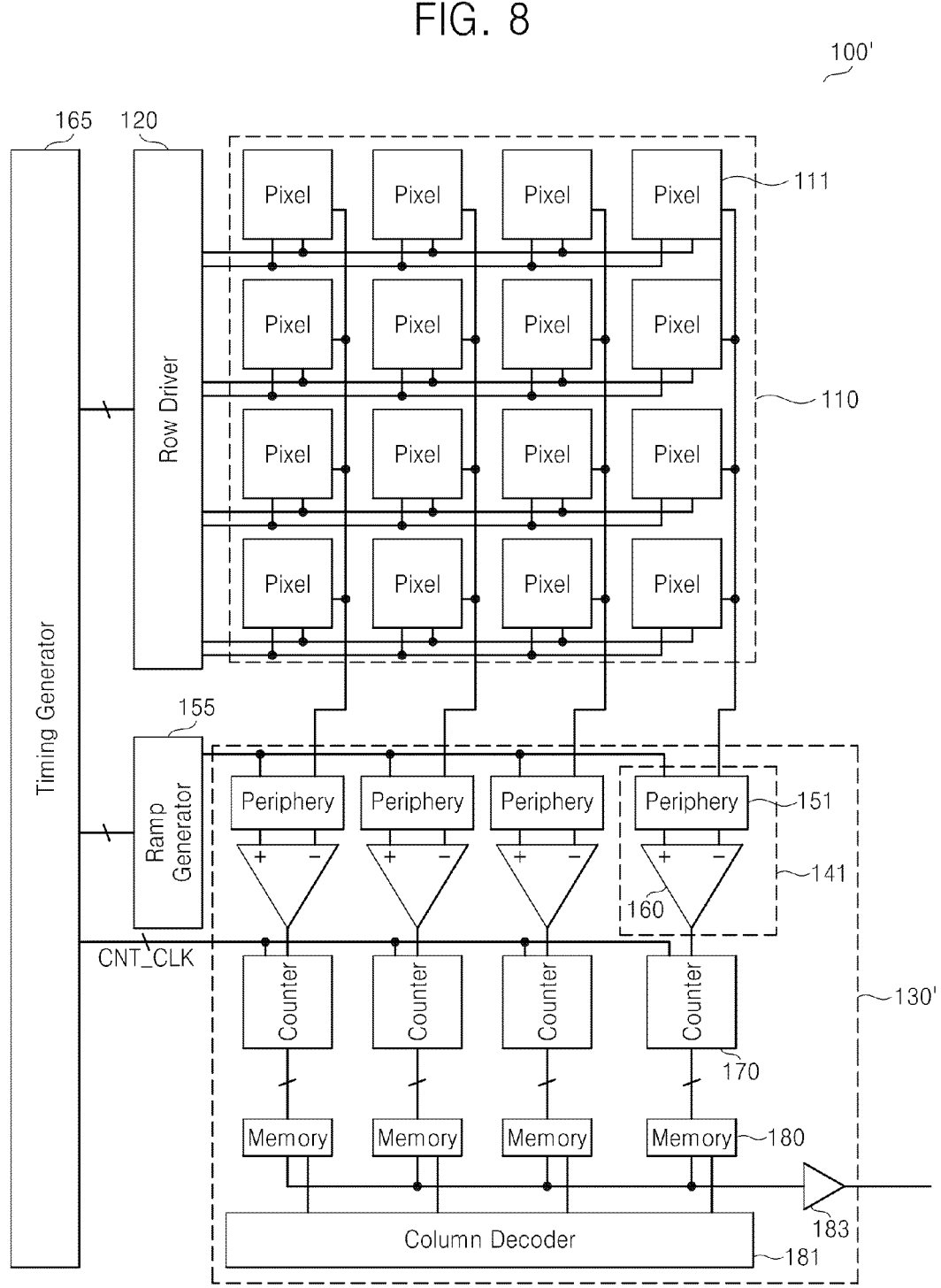
FIG. 8 is a block diagram depicting the image sensor illustrated in FIG. 1 in more detail.

FIG. 8 is a block diagram displaying the image sensor illustrated in FIG. 1 in more detail. Referring to FIG. 8, an image sensor 100' includes a pixel array 110, a row driver 120, an analog to digital converter ADC 130', a ramp signal generator 155 and a timing generator 165.

The ADC 130' includes a plurality of correlated double sampling circuits (hereinafter: "CDS circuits," e.g., 141), a plurality of counters (e.g., 170), a plurality of memories (e.g., 180), a column decoder 181 and a sense amp 183.

Figure 9:
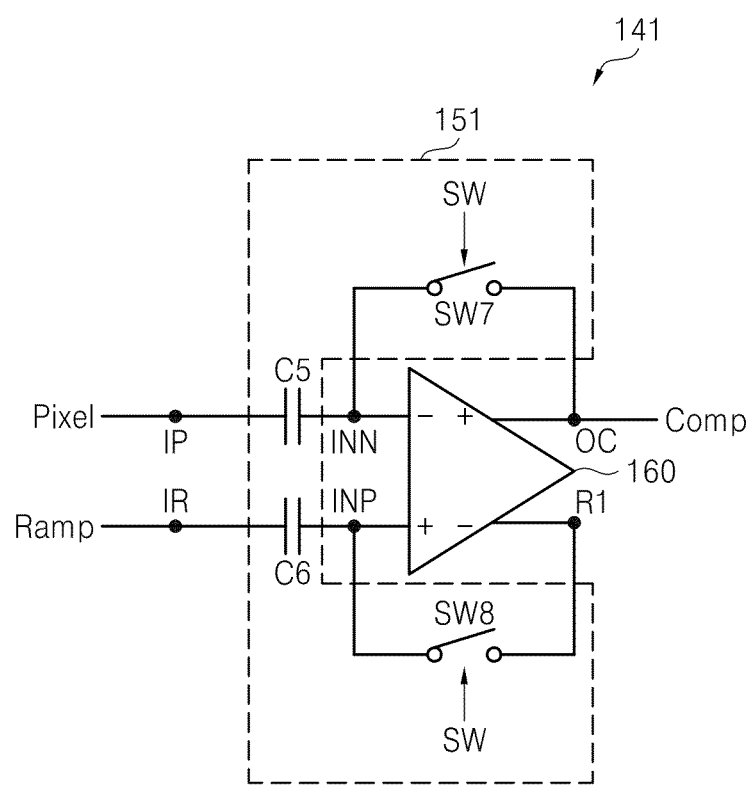
FIG. 9 is a block diagram depicting the CDS circuit according to another exemplary embodiment in more detail.

FIG. 9 is a block diagram displaying the CDS circuit according to another exemplary embodiment in more detail. Referring to FIGS. 1, 8 and 9, the CDS circuit 141 includes a peripheral circuit 151 and a comparator 160.

The periphery circuit 151 includes a pair of capacitors C5 and C6 and a pair of switches SW7 and SW8. A first capacitor C5 is connected between a pixel signal input node IP and a first input node INN to correct an offset of the comparator 160 and a pixel reset level.

A first switch SW7 is connected between the first input node INN and a comparative signal output node OC to control a CDS operation. A second capacitor C5 is connected between a ramp signal input node IR and a second input node INP to correct an offset of the comparator 160 and a ramp level.

A second switch SW8 is connected between the second input node INP and a comparator node R1 to control a CDS operation. The first switch SW7 and the second switch SW8 are controlled by a switch signal SW and the switch signal SW may be generated by the timing generator 165.

Figure 12:
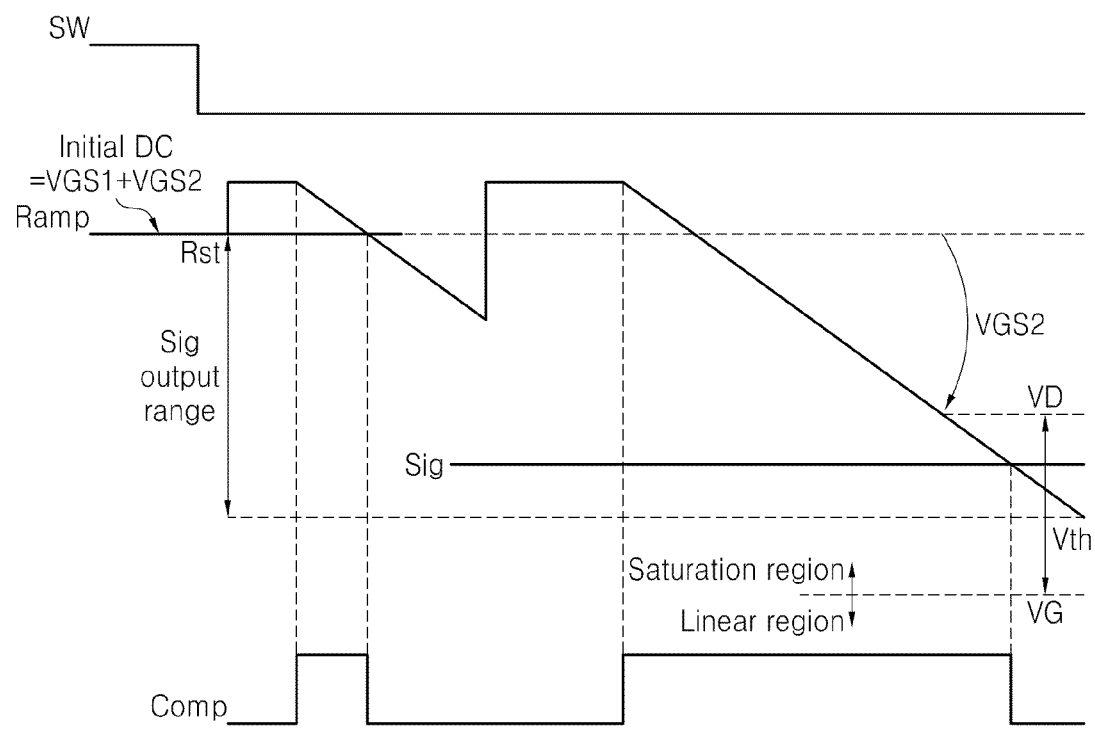
FIG. 12 is a graph for explaining an operation of the CDS circuit of FIG. 10.

As illustrated in FIG. 12, a pixel signal is a reset signal or an image signal. The comparator 160 boosts an initial direct current voltage of a pixel signal (e.g., a reset signal Rst or an image signal Sig) output from a pixel 111 and an initial direct current voltage of a ramp signal to a boosting voltage, compares the pixel signal (e.g., a reset signal Rst or an image signal Sig) having an initial direct current voltage boosted by the boosting voltage with a ramp signal Ramp having an initial direct current voltage boosted by the boosting voltage and outputs a comparative signal Comp corresponding to a comparison result.

Figure 10:
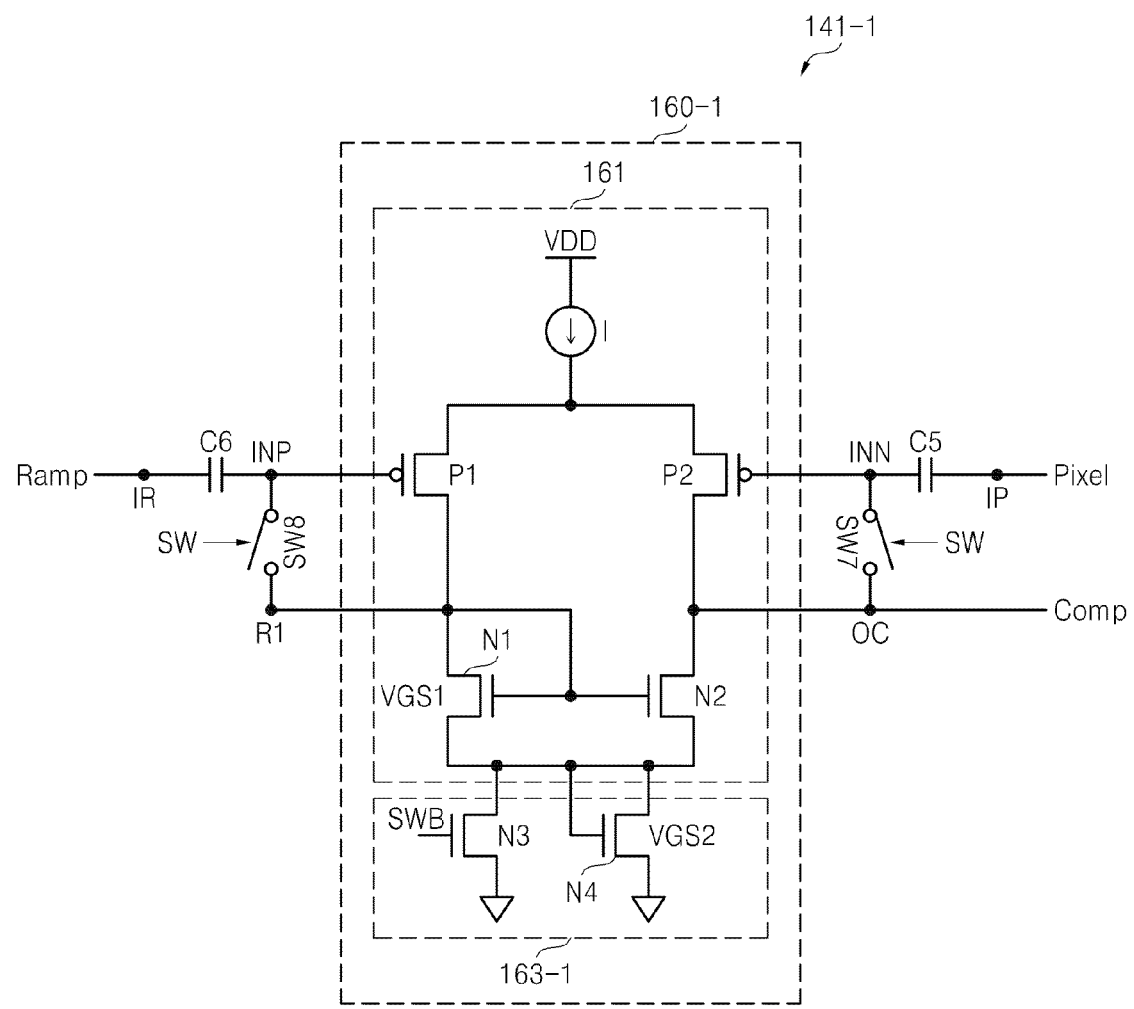
FIG. 10 depicts an exemplary embodiment of the CDS circuit illustrated in FIG. 9.

Each of a CDS circuit 141-1 and a comparator 160-1 illustrated in FIG. 10 depicts an exemplary embodiment of the CDS circuit 141 and the comparator 160 illustrated in FIG. 9, respectively. Referring to FIG. 10, the comparator 160-1 includes a comparator circuit 161 and a boosting circuit 163-1.

The comparator circuit 161 compares a pixel signal (e.g., a reset signal Rst or a pixel signal) having an initial direct current voltage boosted by the boosting voltage with a ramp signal Ramp having an initial direct current voltage boosted by the boosting voltage and outputs a comparative signal Comp corresponding to a comparison result.

The comparator circuit 161 includes a current source I, a plurality of transistors P1 and P2, and a current mirror circuit. A terminal of each of a first transistor P1 and a second transistor P2 is connected to a terminal of the current source I. Each of the first transistor P1 and the second transistor P2 may be a PMOS transistor.

The current mirror circuit includes a third transistor N1 and a fourth transistor N2. A terminal of the third transistor N1 is connected to the other terminal of the first transistor P1 and a terminal of the fourth transistor N2 is connected to the other terminal of the second transistor P2. Each of the third transistor N1 and the fourth transistor N2 may be an NMOS transistor.

Figure 11:
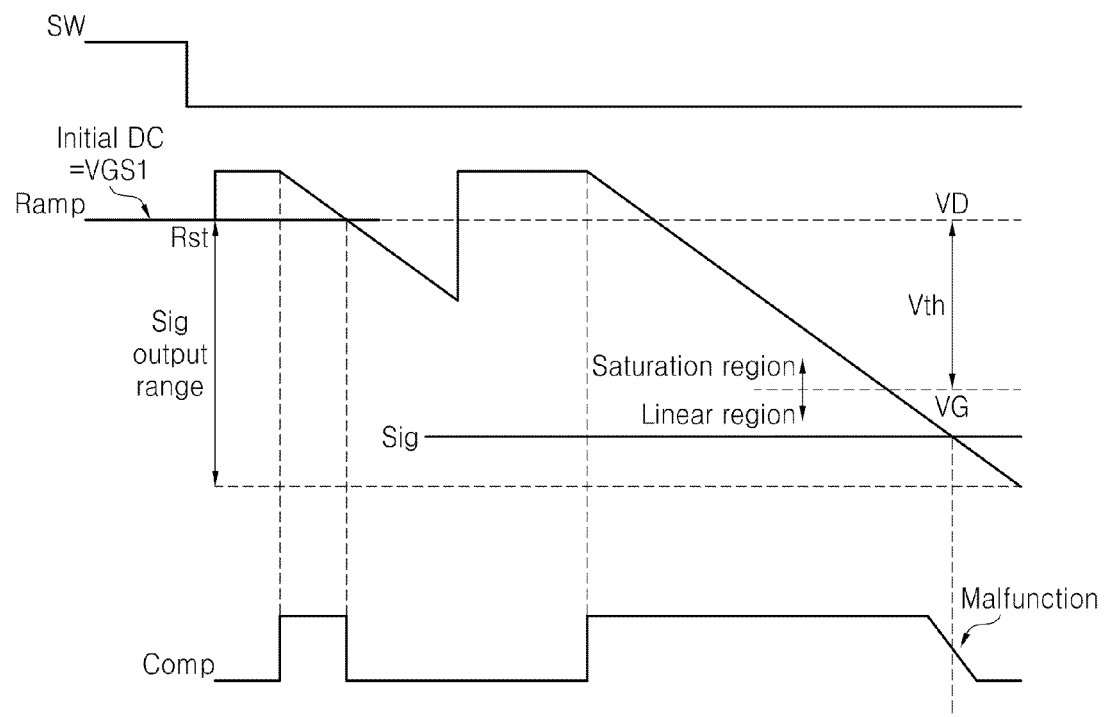
FIG. 11 is a graph for explaining an operation of a conventional CDS circuit.

FIG. 11 is a graph for explaining a conventional CDS circuit. The conventional CDS circuit of FIG. 11 means a circuit where the boosting circuit 163-1 is excluded from the CDS circuit of FIG. 10. Moreover, a ramp signal Ramp, a reset signal Rst or an image signal Sig illustrated in FIG. 11 depicts a signal whose DC is blocked by the first capacitor C5 or the second capacitor C6.

Referring to FIGS. 1 and 8 to 11, when |VGD| is smaller than Vth, the second transistor P2 operates in a saturation region. VGD is a voltage difference between a gate voltage VG of the second transistor P2 and a drain voltage VD of the second transistor P2, and Vth is a threshold voltage of the second transistor P2. When |VGD| is greater than Vth, the second transistor P2 operates in a linear region.

The first transistor P1 has the same electrical characteristics as the second transistor P2, so that the first transistor P1 operates in a saturation region or a linear region when the first transistor P1 has the same condition as each of the above conditions.

An initial DC voltage applied to a first input node INN, i.e., an initial DC voltage of a reset signal Rst, or an initial DC voltage of supplied to a second input node INP, i.e., an initial DC voltage of a ramp signal, is VGS1 which is a difference between a gate voltage and a source voltage of a third transistor N1. Accordingly, when an image signal Sig illustrated in FIG. 11 is applied to the second transistor P2, a voltage difference |VGD| between a gate voltage VG and a drain voltage VD of the second transistor P2 is greater than a threshold voltage Vth. It means that the second transistor P2 operates in a linear region and the operation in the linear region induces an output of an erroneous comparative signal Comp.

Therefore, each of the first transistor P1 and the second transistor P2 of the comparison circuit 161 always needs to operate in a saturation region.

Referring to FIG. 10, a boosting circuit 163-1 generates a boosting voltage VGS2 in response to a control signal SWB to boost an initial DC voltage of a pixel signal Pixel and an initial DC voltage of a ramp signal Ramp. The boosting circuit 163-1 includes a plurality of transistors N3 and N4.

Each of the plurality of transistors N3 and N4 has a terminal connected to the current mirror circuit and the other terminal connected to a ground. Each of the plurality of transistors N3 and N4 may be an NMOS transistor. A fifth transistor N3 is controlled by a control signal SWB. The control signal SWB is an inverting signal of the switch signal SW and may be generated by the timing generator 165. A sixth transistor N4 is a diode connected transistor.

FIG. 12 is a graph for explaining an operation of the CDS circuit of FIG. 10. Referring to FIGS. 1, 8 to 10 and 12, an initial DC voltage applied to a first input node INN, i.e., an initial DC voltage of a reset signal Rst, or an initial DC voltage applied to a second input node INP, e.g., an initial DC voltage of a ramp signal Ramp, is an addition of VGS1, which is difference between a gate voltage and a source voltage of the third transistor N1, and VGS2, which is difference between a gate voltage and a source voltage of the sixth transistor N4. Accordingly, an output range of an image signal Sig is between 0 and (VGS1+VGS2). The boosting circuit 163-1 generates a boosting voltage VGS2 in response to the control signal SWB.

When a switch signal SW is low, the control signal SWB is an inverting signal of the switch signal SW, so that the fifth transistor N3 becomes turned on and the sixth transistor N4 becomes turned off. Additionally, a first switch SW7 and a second switch SW8 become turned off in response to the switch signal SW. Subsequently, a drain voltage VD of the second transistor P2 changes from a boosting voltage, i.e., VGS1+VGS2, to VGS1.

Alike FIG. 11, when |VGD| is smaller than Vth, the second transistor P2 operates in a saturation region, and when |VGD| is greater than Vth, the second transistor P2 operates in a linear region.

An initial DC voltage of a reset signal Rst or an initial DC voltage of a ramp signal Ramp is boosted to a boosting voltage by generation of a boosting voltage VGS2, and a drain voltage VD of the second transistor P2 is lowered due to a level change of the switch signal SW.

The first transistor P1 operates similarly to the second transistor P2. So that the first transistor P1 and the second transistor P2 of the comparison circuit 161 always operate in a saturation region, respectively. For example, when an image signal Sig illustrated in FIG. 12 is applied to the second transistor P2, a voltage difference |VGD| between a gate voltage VG and a drain voltage VD of the second transistor P2 is smaller than a threshold voltage Vth. Accordingly, the second transistor P2 operates in a saturation region.

Figure 13:
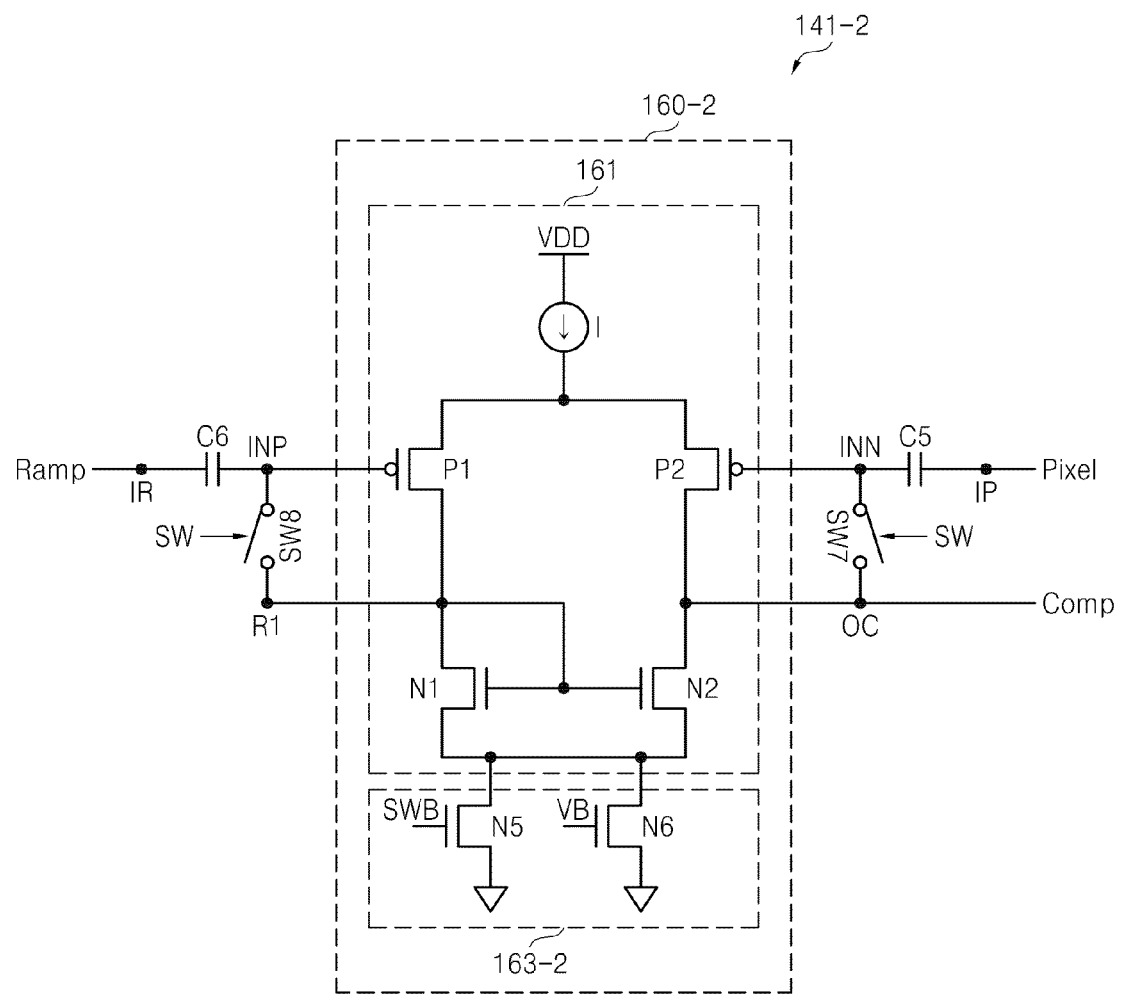
FIG. 13 depicts another exemplary embodiment of the CDS circuit illustrated in FIG. 9.

FIG. 13 depicts another exemplary embodiment of the CDS circuit illustrated in FIG. 9. Each of a CDS circuit 141-2 and a comparator 160-2 illustrated in FIG. 13 depicts another exemplary embodiment of the CDS circuit 141 and the comparator 160 illustrated in FIG. 9. The other components except for a boosting circuit 163-2 in FIG. 13 have the same drawing numerals, operation and function as components illustrated in FIG. 10, so that explanation for them is omitted.

Referring to FIG. 13, the boosting circuit 163-2 includes a plurality of transistors N5 and N6. Each of the plurality of transistors N5 and N6 has a terminal connected to the comparison circuit 161 and the other terminal connected to a ground. Each of the plurality of transistors N5 and N6 may be an NMOS transistor. A seventh transistor N5 may be controlled by a control signal SWB and an eighth transistor N6 may be controlled by a voltage bias signal VB. The voltage bias signal VB may be generated by the timing generator 165.

Figure 14:
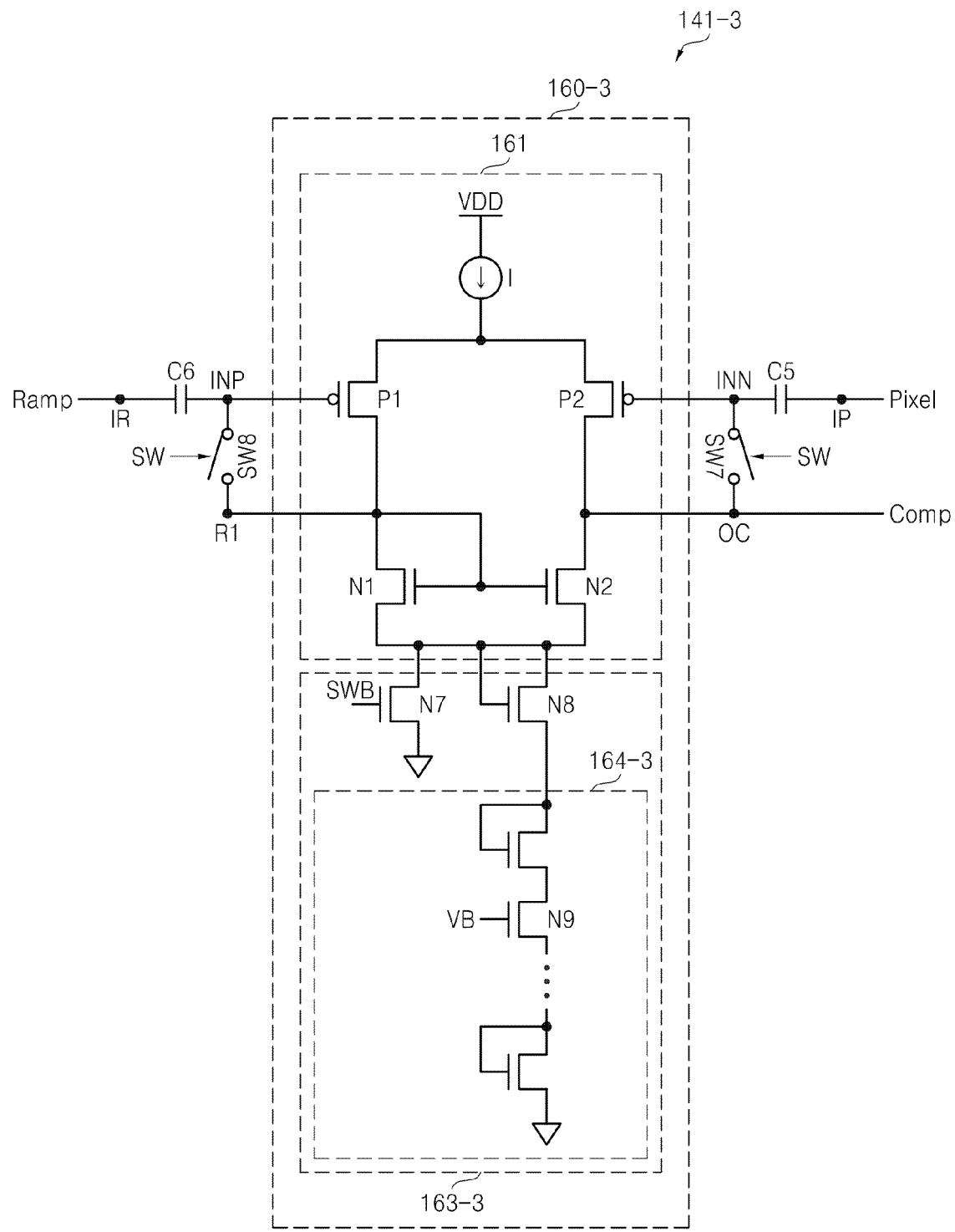
FIG. 14 depicts still another exemplary embodiment of the CDS circuit illustrated in FIG. 9.

FIG. 14 depicts still another exemplary embodiment of the CDS circuit illustrated in FIG. 9. A CDS circuit 141-3 and a comparator 160-3 illustrated in FIG. 14 depict another exemplary embodiment of the CDS circuit 141 and the comparator 160 illustrated in FIG. 9, respectively. The other components except for the boosting circuit 163-3 in FIG. 14 have the same drawing numerals, operation and function as components illustrated in FIG. 10, so that explanation for them is omitted.

Referring to FIG. 14, the boosting circuit 163-3 includes a ninth transistor N7, a tenth transistor N8 and a plurality of transistors 164-3. Each of the ninth transistor N7, the tenth transistor N8 and the plurality of transistors 164-3 is an NMOS transistor.

A terminal of the ninth transistor N7 is connected to the comparison circuit 161 and the other terminal is connected to a ground. The ninth transistor N7 is controlled by a control signal SWB. A terminal of the tenth transistor N8 is connected to the comparator circuit 161 and the other terminal is connected to the plurality of transistors 164-3. Each of the plurality of transistors 164-3 is a diode connected transistor. According to an exemplary embodiment, one (e.g., N9) of the plurality of transistors 164-3 may be controlled by the voltage bias signal VB. A level of the boosting voltage may change variously using the plurality of transistors 164-3.

Figure 15:
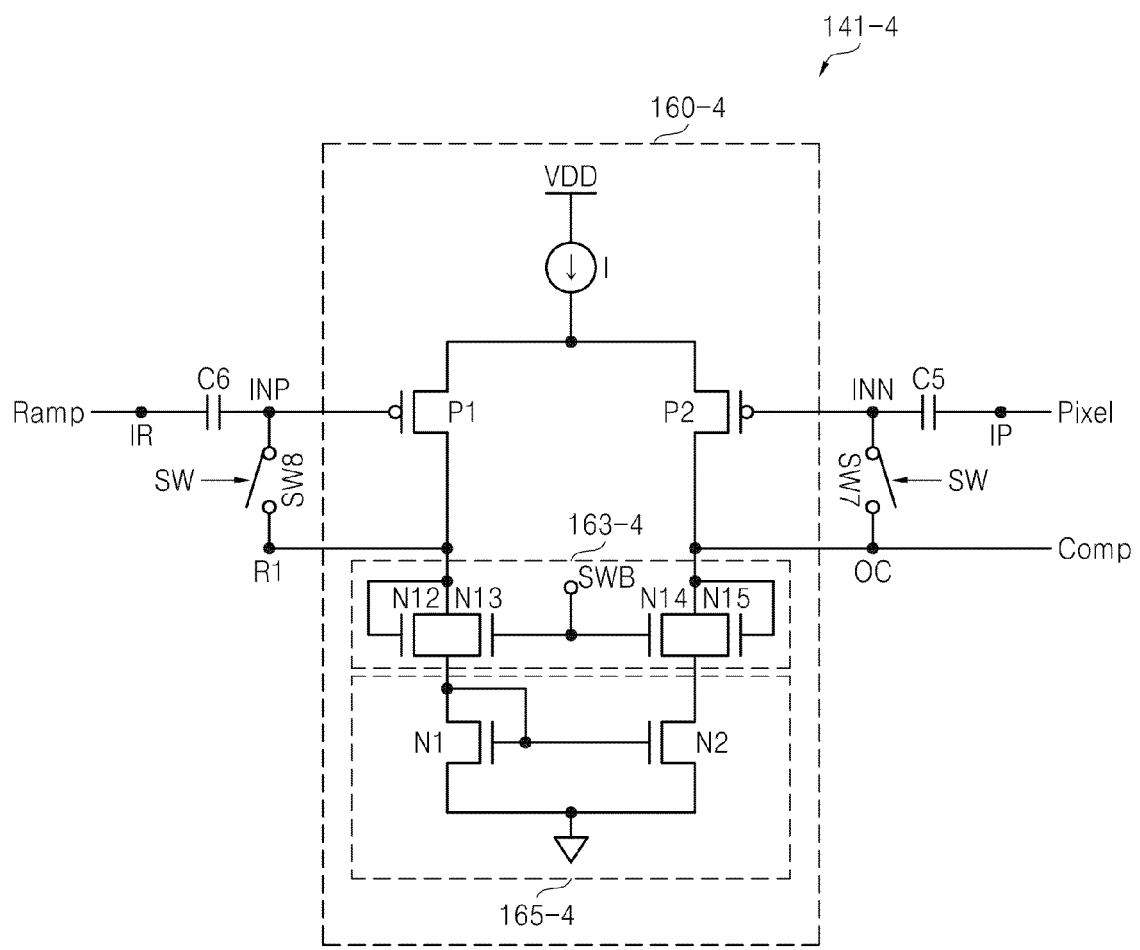
FIG. 15 depicts still another exemplary embodiment of the CS circuit illustrated in FIG. 9.

FIG. 15 depicts still another exemplary embodiment of the CDS circuit illustrated in FIG. 9. A CDS circuit 141-4 and a comparator 160-4 illustrated in FIG. 15 depict another exemplary embodiment of the CDS circuit 141 and the comparator 160 illustrated in FIG. 9, respectively. The other components except for the comparator 160-4 in FIG. 15 have the same drawing numerals, operation and function as components illustrated in FIG. 10, so that explanation for them is omitted.

Referring to FIG. 15, the comparator 160-4 includes a current source I, a first transistor P1, a second transistor P2, a boosting circuit 163-4 and a current mirror circuit 165-4. Each of the first transistor P1 and the second transistor P2 is a PMOS transistor.

The boosting circuit 163-4 includes a plurality of transistors N12, N13, N14 and N15. Each of the plurality of transistors N12, N13, N14 and N15 is an NMOS transistor.

Each of the twelfth transistor N13 and the thirteenth transistor N14 is controlled by a control signal SWB. Each of an eleventh transistor N12 and a fourteenth transistor N15 is a diode connected transistor. The current mirror circuit 165-4 includes a plurality of transistors N1 and N2 as illustrated in FIG. 10.

Figure 16:
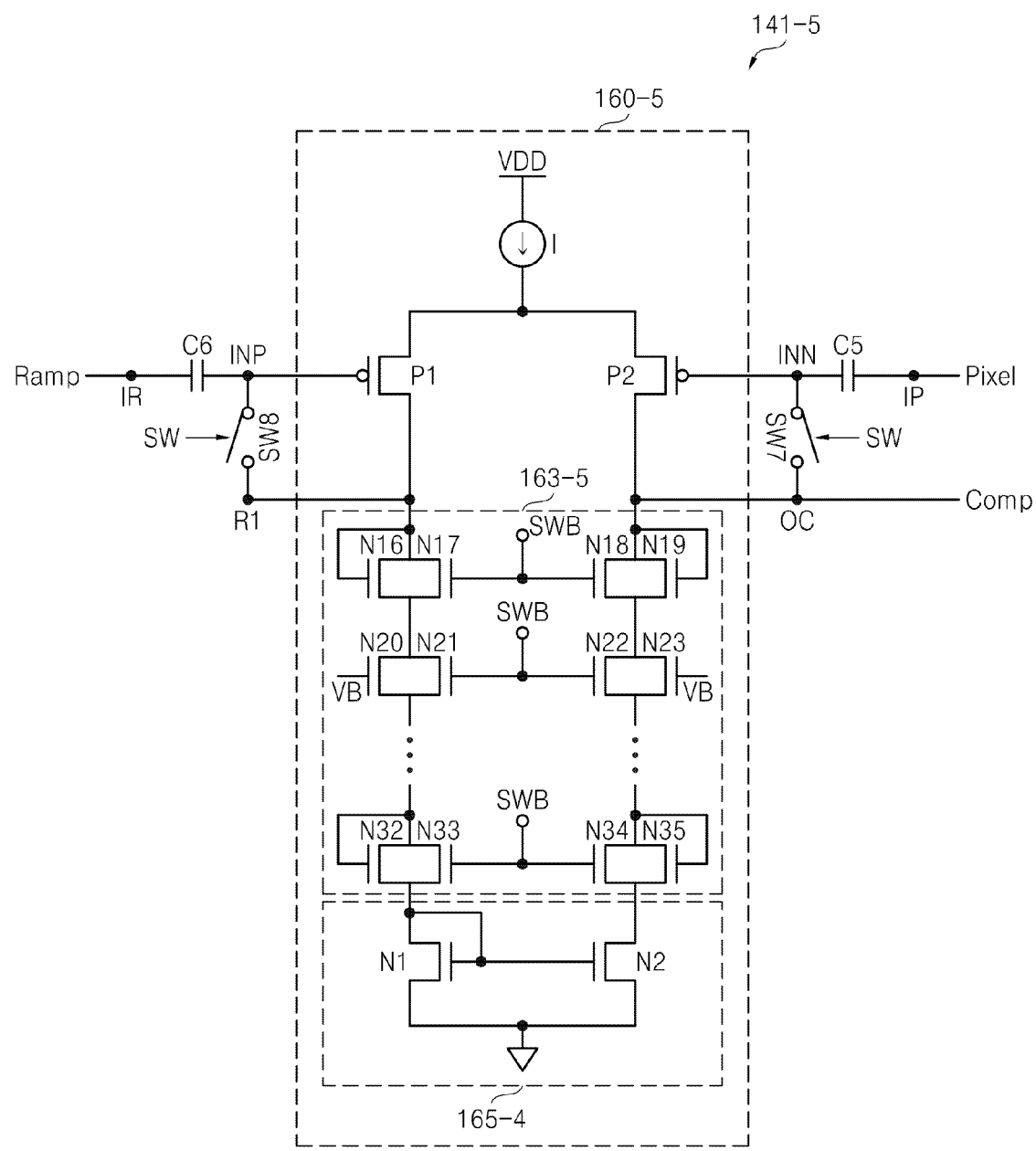
FIG. 16 depicts still another exemplary embodiment of the CDS circuit illustrated in FIG. 9.

FIG. 16 depicts still another exemplary embodiment of the CDS circuit illustrated in FIG. 9. A CDS circuit 141-5 and a comparator 160-5 illustrated in FIG. 16 depict another exemplary embodiment of the CDS circuit 141 and the comparator 160 illustrated in FIG. 9, respectively. The other components except for a boosting circuit 163-5 in FIG. 14 have the same drawing numerals, operation and function as components illustrated in FIG. 15, so that explanation for them is omitted.

The boosting circuit 163-5 includes a plurality of transistors N16, N17, ..., and N35. An operation of some (N17 N18, N21, N22, N33 or N34) of the plurality of transistors N16, N17..., and N35 is controlled by a control signal SWB. According to an exemplary embodiment, an operation of one (N23) of the plurality of transistors N16, N17, ..., and N35 may be controlled by a voltage bias signal VB.

Each of a plurality of first transistors N16, N20, ..., and N32 and a plurality of second transistors N17, N21, ..., and N33 is connected in series between the other terminal of the first transistor P1 and a current mirror circuit 165-4. Each of a plurality of third transistors N18, N22, ..., and N34 and a plurality of fourth transistors N19, N23, ..., and N35 is connected in series between the other terminal of the second transistor P2 and the current mirror circuit 165-4.

Referring to FIGS. 1, 8 and 12, a comparative signal Comp may correspond to a difference value between an image signal Sig and a rest signal Rst which are changed according to intensity of illumination of an external light. The comparator 160 may pick up difference between the image signal Sig and the reset signal Rst and output a comparative signal Comp according to a gradient of a ramp signal by using a ramp signal Ramp to output difference between the image signal Sig and the reset signal Rst. A ramp signal generator 155 may operate based on a control signal generated by the timing generator 165.

A counter 170 is connected to an output terminal of the comparator 160, and counts a comparative signal Comp according to a clock CNT_CLK input from the timing generator 165 and outputs a counting value by a digital signal. Here, the clock CNT_CLK may be generated by a counter controller (not shown) located inside the counter 170 or inside the timing generator 165 based on a counter control signal generated by the timing generator 165, and the counter 170 may be embodied in an up/down counter or a bit-wise inversion counter.

A memory 180 may operate according to a memory control signal generated by a memory controller (not shown) located inside the memory 180 or inside the timing generator 165, and may be embodied in a SRAM. The memory 180 receives and stores a digital signal output from the counter 170. One of digital signals stored in a plurality of memories is amplified by a sense amp 183 and output as an image data under a control of a column decoder 181.

A buffer 190 stores tentatively image data output from an ADC 130 and transmits the image data to a digital signal processor 200.

Figure 17:
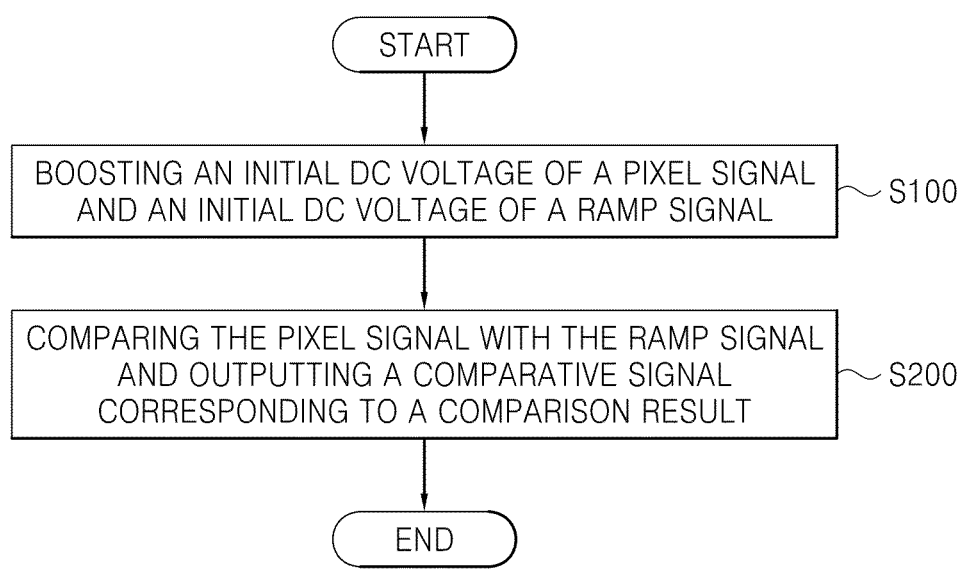
FIG. 17 is a flowchart for explaining an operation method of the CDS circuit according to an exemplary embodiment.

FIG. 17 is a flowchart for explaining an operation method of a CDS circuit according to an exemplary embodiment. Referring to FIGS. 1, 8 to 10, and 17, the boosting circuit 163-1 boosts an initial DC voltage of a pixel signal Pixel and an initial DC voltage of a ramp signal Ramp as much as a boosting voltage, e.g., VGS2, in response to a control signal SWB (S100). The comparator circuit 161 compares a pixel signal Pixel having a boosted initial DC voltage with a ramp signal Ramp having a boosted initial DC voltage, and outputs a comparative signal Comp corresponding to a comparison result (S200).

Figure 18:
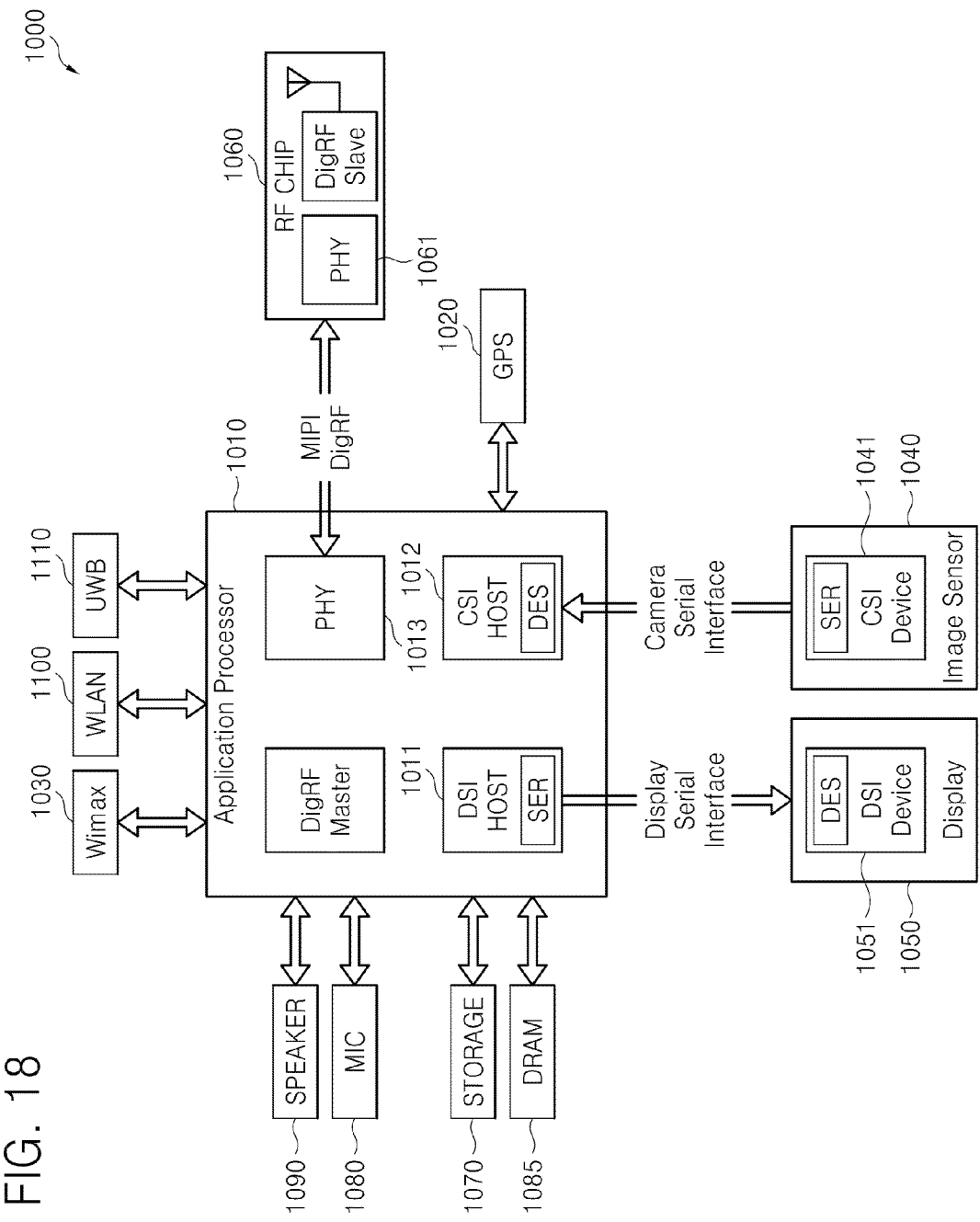
FIG. 18 is a schematic block diagram of another image sensing system including an image sensor according to an exemplary embodiment.

FIG. 18 depicts a schematic block diagram of another image sensing system including an image sensor according to an exemplary embodiment. Referring to FIG. 18, an image sensing system 1000 may be embodied in a data processing device which may use or support a mobile industry processor interface (MIPI®), e.g., a cellular phone, a PDA, a PMP or a smart phone.

The image sensing system 1000 includes an application processor 1010, an image sensor 1040 and a display 1050. A CSI host 1012 embodied in the application processor 1010 may perform a serial communication with a CSI device 1041 of the image sensor 1040 through a camera serial interface (CSI). Here, for example, an optical de-serializer may be embodied in the CSI host 1012 and an optical serializer may be embodied in the CSI device 1041. The image sensor 1040 is the image sensor 100 illustrated in FIG. 2 or the image sensor 100' illustrated in FIG. 8.

A DSI host 1011 embodied in the application processor 1010 may perform a serial communication with a DSI device 1051 of a display 1050 through a display serial interface (DSI). Here, for example, an optical serializer may be embodied in the DSI host 1011 and an optical de-serializer may be embodied in the DSI device 1051.

The image sensing system 1000 may further include a RF chip 1060 which may communicate with the application processor 1010. A PHY 1013 of the image sensing system 1000 and a PHY 1061 of the RF chip 1060 may transmit or receive data according to MIPI DigRF.

The image sensing system 1000 may further include a GPS 1020, a storage 1070, a mike 1080, a DRAM 1085 and a speaker 1090, and may communicate using Wimax 1030, WLAN 1100 and UWB 1110.

A CDS circuit according to an exemplary embodiment may have a wider input range by dividing each of a pixel signal and a ramp signal and compressing the pixel signal and the ramp signal by using capacitive dividing. In addition, the CDS circuit may have a wider input range by equipping a boosting circuit boosting each of the pixel signal and the ramp signal.

Although a few exemplary embodiments have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A correlated double sampling (CDS) circuit comprising:
    a plurality of first capacitors;
    a plurality of second capacitors; and
    a switch arrangement which, in response to a switch control signal, at least one of:
        connects the plurality of first capacitors in series between a pixel signal output node and a ground to compress the pixel signal and connects the plurality of second capacitors in series between a ramp signal output node and the ground to compress the ramp signal, or connects the plurality of first capacitors in parallel between the pixel signal output node and a first input node of the comparator and connects the plurality of second capacitors in parallel between the ramp signal output node and a second input node of the comparator.

2. The CDS circuit of claim 1, wherein the plurality of first capacitors comprises:
a first capacitor connected between the pixel signal output node and the first input node; and
a second capacitor comprising a terminal that is connected to the first input node.

3. The CDS circuit of claim 2, wherein the plurality of second capacitors comprises:
a third capacitor connected between the ramp signal output node and the second input node; and
a fourth capacitor comprising a terminal that is connected to the second input node.

4. The CDS circuit of claim 3, wherein the switch arrangement comprises:
a first switch and a second switch connected in series between the pixel signal output node and the ground via a second terminal of the second capacitor; and
a third switch and a fourth switch connected in series between the ramp signal output node and the ground via a second terminal of the fourth capacitor.

5. An image sensor comprising:
a plurality of first capacitors;
a plurality of second capacitors; and
a switch arrangement which, in response to a switch control signal, at least one of:
connects the plurality of first capacitors in series between a pixel signal output node and a ground to compress the pixel signal and connects the plurality of second capacitors in series between a ramp signal output node and the ground to compress the ramp signal, or
connects the plurality of first capacitors in parallel between the pixel signal output node and a first input node of the comparator and connects the plurality of second capacitors in parallel between the ramp signal output node and a second input node of the comparator.

6. The image sensor of claim 5, wherein the plurality of first capacitors comprises:
a first capacitor connected between the pixel signal output node and the first input node; and
a second capacitor comprising a terminal that is connected to the first input node.

7. The image sensor of claim 6, wherein the plurality of second capacitors comprises:
a third capacitor connected between the ramp signal output node and the second input node; and
a fourth capacitor comprising a terminal that is connected to the second input node.

8. The image sensor of claim 7, wherein the switch arrangement comprises:
a first switch and a second switch connected in series between the pixel signal output node and the ground via a second terminal of the second capacitor; and
a third switch and a fourth switch connected in series between the ramp signal output node and the ground via a second terminal of the fourth capacitor.

9. An image sensing system comprising:
an application processor; and
an image sensor configured to perform serial communication with the application processor,
wherein the image sensor including:
a plurality of first capacitors;
a plurality of second capacitors; and
a switch arrangement which, in response to a switch control signal, at least one of:
connects the plurality of first capacitors in series between a pixel signal output node and a ground to compress the pixel signal and connects the plurality of second capacitors in series between a ramp signal output node and the ground to compress the ramp signal, or
connects the plurality of first capacitors in parallel between the pixel signal output node and a first input node of the comparator and connects the plurality of second capacitors in parallel between the ramp signal output node and a second input node of the comparator.

10. The image sensing system of claim 9, wherein the plurality of first capacitors comprises:
a first capacitor connected between the pixel signal output node and the first input node; and
a second capacitor comprising a terminal that is connected to the first input node.

11. The image sensing system of claim 10, wherein the plurality of second capacitors comprises:
a third capacitor connected between the ramp signal output node and the second input node; and
a fourth capacitor comprising a terminal that is connected to the second input node.

12. The image sensing system of claim 11, wherein the switch arrangement comprises:
a first switch and a second switch connected in series between the pixel signal output node and the ground via a second terminal of the second capacitor; and
a third switch and a fourth switch connected in series between the ramp signal output node and the ground via a second terminal of the fourth capacitor.

13. The image sensing system of claim 11, wherein the application processor includes a camera serial interface (CSI) host and the image sensor includes a CSI device, the CSI host configured to perform the serial communication with the CSI device through the CSI.

* * * * *